United States Patent [19]
Anesi

[11] 3,911,575
[45] Oct. 14, 1975

[54] CUTTING TOOL

[75] Inventor: Mario Anesi, Inverness, Ill.

[73] Assignee: Ansan Tool and Manufacturing Co., Inc., Chicago, Ill.

[22] Filed: May 13, 1974

[21] Appl. No.: 469,054

[52] U.S. Cl. .............................................. 30/164.9
[51] Int. Cl.$^2$ ......................................... B26B 1/04
[58] Field of Search .......... 30/164.9, 299, 351, 353, 30/355

[56] References Cited
UNITED STATES PATENTS

| | | | |
|---|---|---|---|
| 891,871 | 6/1908 | Smith | 30/353 X |
| 2,137,333 | 11/1938 | Colburn | 30/164.9 X |
| 2,732,620 | 1/1956 | Gibbs | 30/299 X |
| 2,847,758 | 8/1958 | Kozan | 30/164.9 |
| 3,389,463 | 6/1968 | Gerek | 30/164.9 |

Primary Examiner—Al Lawrence Smith
Assistant Examiner—J. C. Peters
Attorney, Agent, or Firm—Prangley, Dithmar, Vogel, Sandler & Stotland

[57] ABSTRACT

An adjustable tool for cutting sheet material includes an elongated handle having an axial slot at one end thereof receiving therein a circular cutting blade mounted for rotational movement about the axis of a mounting screw, the blade having a notch in the perimeter thereof and having a V-beveled cutting edge extending circumferentially therearound between the outer ends of the notch, the notch having a flat surface laying in a plane which preferably does not pass through the center of the blade, the flat surface intersecting the V-beveled cutting edge to form two additional cutting edges. In use, the flat surface is disposed at a first angle with respect to the surface of the sheet material to be cut and at a second angle with respect to the longitudinal axis of the handle. The blade is clamped in place by a wing nut which may be loosened to permit adjustment of the second angle without changing the first angle to facilitate manipulation of the cutting tool.

2 Claims, 7 Drawing Figures

U.S. Patent    Oct. 14, 1975    3,911,575
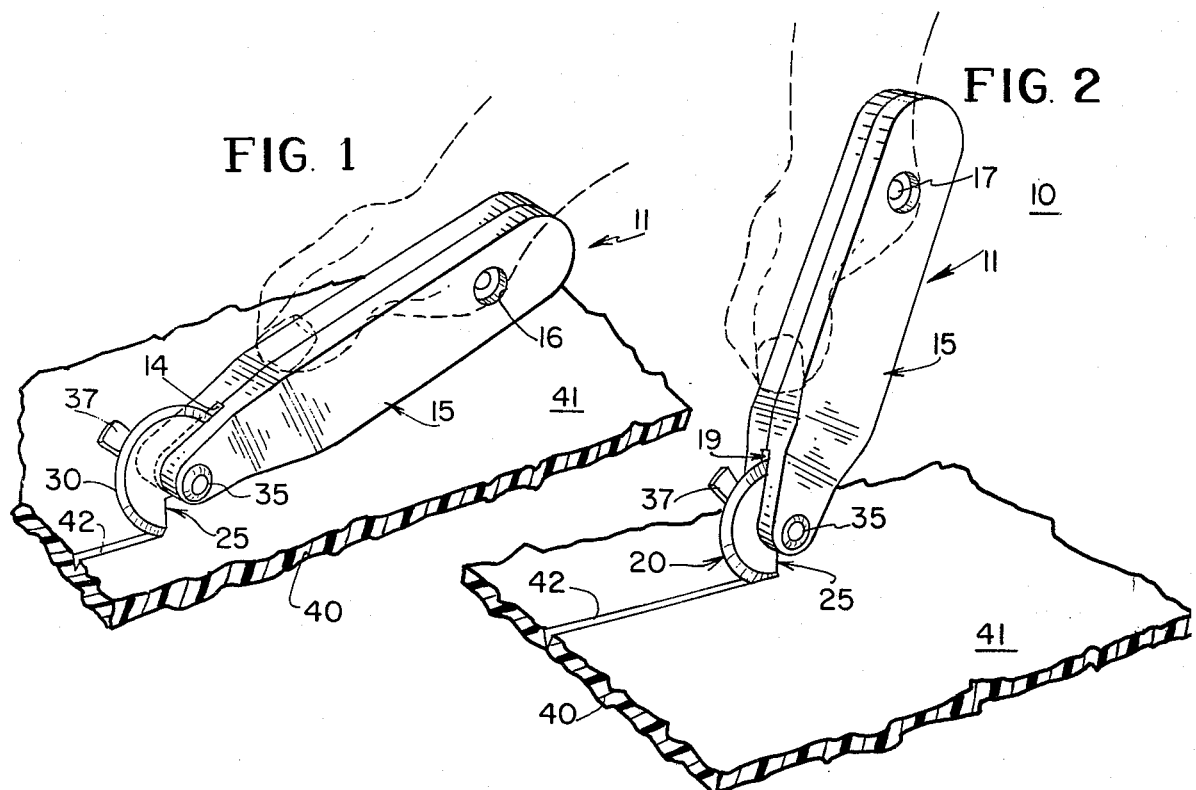
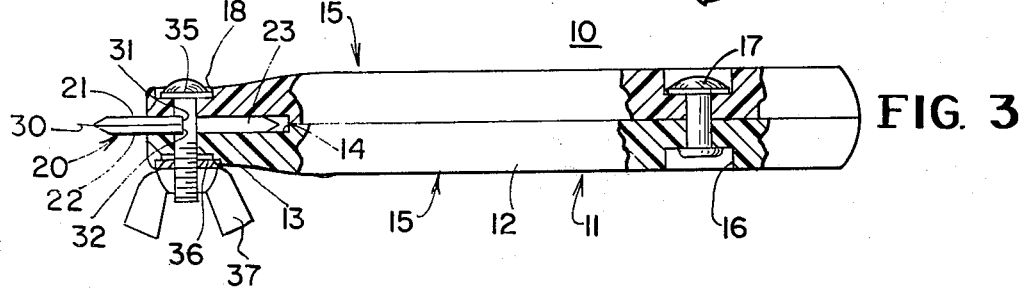
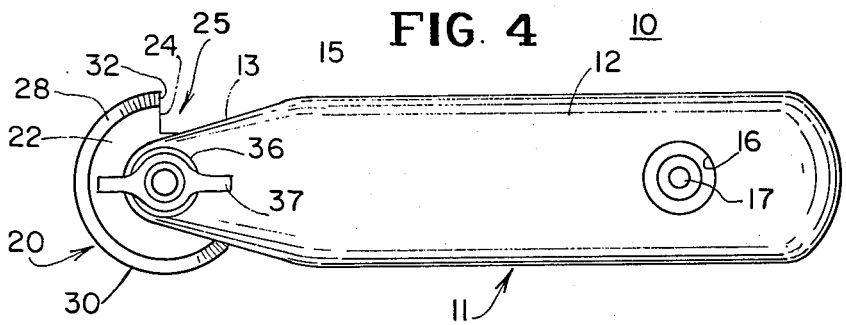
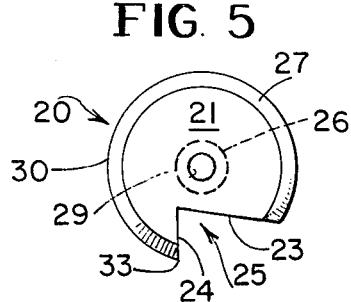
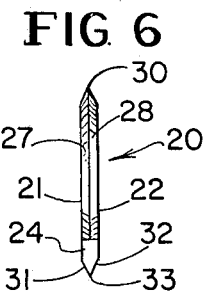
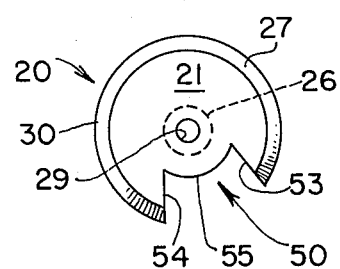

CUTTING TOOL

BACKGROUND OF THE INVENTION

The present invention relates to a hand tool adapted for cutting sheet materials, such as laminated plastics, formica, decorative plastics, tileboard, and the like. In particular, the present invention relates to an adjustable cutting tool.

Cutting tools for cutting such sheet materials are known in the prior art, such a tool being disclosed in U.S. Pat. No. 3,601,893, issued to Lyle N. Knox on Aug. 31, 1971. The Knox patent describes a hand tool including an elongated blade having a straight V-beveled edge at the distal end thereof, and having a cutting tooth defined by the intersection of the beveled edge with an inwardly directed flat surface. The blade is pivotally mounted at the other end thereof on a hollow handle into which the blade may be folded when not in use, in much the same manner as a pocket knife. In use, the Knox tool is pulled across the sheet material to be cut, the cutting tooth scoring the surface of the sheet material and forming a generally V-shaped groove therein. This groove defines a break line along which the sheet material may easily be broken. The blade of the Knox tool may be sharpened by filing or grinding the inwardly directed edge, thereby relocating it forwardly from its original position until its intersection with the V-beveled straight edge again forms a sharp cutting point or tooth.

However, in the Knox tool and other similar cutting tools, the tool has only a single optimum cutting position, wherein the inwardly directed surface of the blade is disposed at a predetermined optimum angle with respect to the surface of the sheet material to be cut. The blade is, in use, disposed substantially coaxially with the elongated handle in a fixed position and, therefore, if the user wishes to change the position of his hand in grasping the tool, this will alter the angle between the inwardly directed blade edge and the surface of the sheet material being cut, resulting in less efficient operation of the tool. Accordingly, if the tool is to work properly, the handle must be held as indicated in Knox's FIG. 1, at a very shallow angle with respect to the surface of the sheet material being cut.

Furthermore, since the V-beveled cutting edge of the Knox tool is straight, in sharpening the tool, the inwardly directed edge must be relocated in a position parallel to the original position of that edge in order to maintain the proper tooth shape where the inwardly directed edge intersects the V-beveled edge. It is apparent from the shape of the Knox blade that very few such sharpenings can be effected before the blade material in front of the inwardly directed edge would be exhausted.

SUMMARY OF THE INVENTION

The present invention relates to a hand tool for cutting sheet material, in which the inclination of the handle of the tool with respect to the surface of the sheet material being cut may be readily adjusted without effecting the relationship between the cutting blade and the surface of the sheet material being cut. This arrangement permits easy grasping and manipulation of the tool, more readily to accommodate use of the tool by a wide variety of users and with a wide variety of orientations of the sheet material being cut.

Furthermore, it is a general object of the invention to provide a cutting blade which may be resharpened a great number of times, thereby extending the life of the blade substantially beyond the life of the prior art blades.

It is an important object of the present invention to provide an adjustable tool for cutting sheet material comprising an elongated handle, a blade attached to the handle and extending therefrom, the blade having three cutting edges intersecting to form a cutting point, two of the cutting edges lying in a plane disposed in use at a first angle with respect to the surface of the associated sheet material and at a second angle with respect to the longitudinal axis of the handle, the blade being movable with respect to the handle for varying the second angle, whereby in use the inclination of the handle with respect to the surface of the associated sheet material may be adjusted without varying the first angle.

Still another object of this invention is to provide an adjustable tool of the type set forth, wherein the blade is substantially circular and has a recess formed on the perimeter thereof, the blade having two radially outwardly converging surfaces intersecting to form an arcuate cutting edge extending circumferentially thereof between the outer ends of the recess, the recess including a flat planar surface intersecting the converging surfaces respectively to form two straight cutting edges which intersect at the arcuate cutting edge to form the cutting point, the flat surface being disposed at the first angle with respect to the surface of the associated sheet material.

Further features of the invention pertain to the particular arrangement of the parts of the adjustable tool whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 1 is a perspective view of an adjustable cutting tool constructed in accordance with and embodying the features of a first embodiment of the present invention, the tool being illustrated in use in cutting sheet material, with the handle disposed in a first position;

FIG. 2 is a view similar to FIG. 1, illustrating the tool with the handle disposed in a second use position;

FIG. 3 is a side elevational view in partial section of the tool illustrated in FIGS. 1 and 2;

FIG. 4 is a bottom plan view of the cutting tool as illustrated in FIG. 3;

FIG. 5 is a side elevational view of the cutting blade of the tool as illustrated in FIGS. 1 through 4, viewed from the side facing the viewer in FIGS. 1 and 2;

FIG. 6 is an elevational view of the cutting blade of FIG. 5, as viewed from the right-hand side thereof; and FIG. 7 is a view similar to FIG. 5 of a second embodiment of the cutting blade of the present invention.

DESCRIPTION OF THE PREFERRED EMBODIMENTS

Referring now to FIGS. 1 through 6 of the drawings, there is illustrated an adjustable cutting tool, generally designated by the numeral 10, which includes an elongated handle generally designated by the numeral 11, having mounted at one end thereof a blade generally designated by the numeral 20. The handle 11 may be constructed of any suitable material, but preferably it is formed of plastic and is molded in two mating halves, each designated by the numeral 15. Since the halves 15 of the handle are identically constructed, only one of these halves will be described in detail. Each of the handle halves 15 includes an elongated generally rectangular main body portion 12, terminating at one end thereof in a tapered mounting arm 13, the inner surface of which has a recess 14 formed therein. Formed in the outer surface of the body portion 12 is a circular recess 16, and formed in the outer surface of the tapered mounting arm 13 is a circular recess 18. In use the inner surfaces of the handle halves 15 are placed together in facing relationship and are secured together by means of a rivet 17 or other suitable fastener disposed in the recesses 16 and passing through complementary openings in the mating halves 15. When thus secured together, the recesses 14 of the mounting arms 13 cooperate to define a slot 19 which separates the mounting arms 13 for accommodating therebetween the blade 20.

The blade 20 is generally in the shape of a relatively flat circular disc having flat opposite side surfaces 21 and 22. Disposed centrally of the blade 20 and extending axially therethrough between the side surfaces 21 and 22 is a circular opening 29 for receiving therethrough a mounting screw, as will be described more fully below. Formed in the perimeter of the blade 20 is a generally V-shaped notch 25, the bisector of which preferably does not pass through the center of the circular blade, whereby the notch 25 includes a relatively long flat surface 23 and a relatively short flat surface 24, each extending between the side surfaces 21 and 22. Preferably, the short flat surface 24 is tangent to an imaginary circle 26 concentric with the blade 20 but having a diameter substantially less than the diameter of the blade 20.

The side surfaces 21 and 22 are beveled at the perimeters thereof respectively to define bevel surfaces 27 and 28 which converge radially outwardly of the blade 20 to intersect at an arcuate cutting edge 30 which extends circumferentially of the blade 20 from the outer edge of the flat surface 23 to the outer edge of the flat surface 24. The flat surface 24 intersects the bevel surfaces 27 and 28, respectively, to form two short straight cutting edges 31 and 32 which meet at the cutting edge 30 to define a cutting point 33, as is best illustrated in FIG. 6.

The thickness of the blade 20 is slightly less than the width of the slot 19 when the mounting arms 13 are in their normal unstressed condition. Thus, in assembling the tool 10, the blade 20 is inserted in the slot 19 between the mounting arms 13 and is mounted in place by a suitable fastener such as mounting screw 35 which is received through the opening 29 in the blade 20 and through complementary openings in the mounting arms 13. The head of the screw 35 is seated in the recess 18 in one of the mounting arms 13, and there is preferably received in the recess 18 of the other mounting arm 13 a washer 36, the entire assembly being secured in place by a wing nut 37.

The operation of the cutting tool 10 will now be described. When it is desired to cut a piece of sheet material 40, such as plastic or the like, the cutting tool 10 is used to score or groove one surface 41 of the sheet material 40. In this opeation, the short flat surface 24 of the blade 20 is preferably disposed approximately normal to the surface 41 of the sheet material 40. In order to secure the blade 20 in place in the handle 11, the wing nut 37 is tightened for drawing the mounting arms 13 toward each other and securely clamping the blade 20 therebetween and holding the blade 20 against rotation about the axis of the screw 35. It will be understood that the shape and material of the mounting arms 13 is such that they have sufficient flexibility and resilience to accommodate this blade clamping motion.

When the blade 20 is thus securely held in place in the handle 11, the tool 10 is drawn across the sheet material 40, with the cutting edges 30, 31 and 32 of the blade 20 cooperating to cut a generally V-shaped groove 42 in the surface 41 of the sheet material 40. By repeated manipulation of the tool 10 in this manner, the depth of the groove 42 may be incrementally increased, until the sheet material 40 is cut or scored to a sufficient depth to permit its clean breakage by hand along the break line defined by the groove 42.

It is a significant feature of the present invention that, by loosening of the wing nut 37 and rotation of the handle 10 with respect to the blade 20, the angle between the short flat surface 24 of the blade 20 and the longitudinal axis of the handle 10 may be varied at will, thereby to adjust the inclination of the handle 10 with respect to the surface 41 of the sheet material 40, while maintaining unaltered the angle between the short flat surface 24 of the blade 20 and the surface 41 of the sheet material 40. Thus, for example, if it is more comfortable or efficient for the user to position the handle 10 in the configuration illustrated in FIG. 2 rather than that illustrated in FIG. 1, a change from one configuration to the other may be simply and easily accomplished without in any way hindering the operation of the tool.

If, through repeated use, the cutting edges 30, 31 and 32 become dull or worn, the blade 20 may be resharpened by grinding back the short flat surface 24 to relocate it at a position forwardly of its original position in a clockwise direction, as viewed in FIG. 5, until the cutting point 33 is restored to its original sharp condition, as illustrated in FIG. 6. Preferably, the short flat surface 24 will be reground or filed during sharpening to new positions which are always substantially tangent to the imaginary circle 26. In this manner, the short flat surface 24 will, during repeated sharpenings of the blade 20, advance circumferentially about the blade 20, thereby making the maximum use of the material available in the blade 20 and greatly increasing the useful life of the blade 20.

Referring now to FIG. 7 of the drawings, there is illustrated an alternative embodiment of the blade 20 which is provided with a different shaped notch in the perimeter thereof. The embodiment of FIG. 7 is identical to the embodiment of FIG. 5, with the exception of the shape of the notch, whereby the identical portions of the two embodiments have been designated by the same reference numerals in FIGS. 5 and 7. In the embodiment of FIG. 7, the blade 20 had formed therein a notch generally designated by the numeral 50. The notch 50 includes two short flat surfaces 53 and 54 which are, respectively, tangent to the imaginary circle 26 and are interconnected by a surface 55, the surfaces 53 and 54 preferably subtending an arc at the perimeter of the blade 20 substantially equal to the arc subtended by the surfaces 23 and 24 in FIG. 5. Preferably, each of the surfaces 53 and 54 is identical to the surface 24 in FIG. 5, whereby there are provided two separate cutting points each identical to the cutting point 33 illustrated in FIG. 6.

It will be understood that, in use, the embodiment of FIG. 7 provides two separate cutting points, whereby the useful life of the blade 20 between sharpenings is effectively doubled. More particularly, when one of the cutting points has become dull the handle 11 is simply turned over, to the configuration illustrated in FIG. 4, the wing nut 37 is loosened and the blade 20 is rotated in a counterclockwise direction, as viewed in FIG. 4, until the other flat surface of the notch 50 projects downwardly from the mounting arms 13 at the desired angle for cutting. The wing nut 37 is then retightened to clamp the blade 20 in place and cutting is resumed with the other cutting point.

It will be appreciated that the arc subtended by the notches 25 and 50 of blade 20 is not critical, but need only be large enough so that when the surfaces 24 or 54 of the blade 20 are disposed in use at the desired angle to the surface 41 of the sheet material 40, the opposite surfaces of the notches 25 or 50 will be clear of the sheet material 40 to permit unobstructed operation of the cutting tool. As long as this condition is achieved, it is desirable to minimize the arc subtended by the notches 25 and 50 so as to maximize the amount of useful material in the blade 20, this arc preferably being no more than about 90 degrees.

Furthermore, it will be understood that the relative sizes of the handle 11 and blade 20 may be varied, as desired, and any suitable material may be used for construction of these elements. Similarly, suitable alternative means for mounting the blade 20 in the handle 11 might be used.

From the foregoing, it can be seen that there has been provided a novel adjustable hand tool for cutting sheet material, the tool being simply and economically constructed and adapted for great simplicity of operation.

There has also been provided an adjustable cutting tool of the character described, wherein the inclination of the tool handle with respect to the workpiece may be varied without effecting the inclination of the blade with respect to the workpiece.

There has also been provided an adjustable cutting tool of the character described, which includes a generally circular blade which facilitates the adjustability of the tool and also serves to maximize the useful life of the blade through repeated resharpenings.

There have also been provided two alternative forms of a cutting blade, one having a single cutting point and the other having two separate cutting points for doubling the useful life of the blade between sharpenings.

While there have been described what are at present to be considered the preferred embodiments of the invention, it will be understood that various modifications may be made therein, and it is intended to cover in the appended claims all such modifications as fall within the true spirit and scope of the invention.

I Claim:

1. An adjustable tool for cutting sheet material comprising an elongated handle, a substantially circular blade attached to said handle and extending therefrom, said blade having a recess formed in the perimeter thereof, said recess being substantially V-shaped, said blade having two radially outwardly converging surfaces intersecting to form an arcuate cutting edge extending circumferentially thereof between the outer ends of said recess, said recess including a flat planar surface intersecting said converging surfaces respectively to form two straight cutting edges which intersect at said arcuate cutting edge to form a cutting point, said flat planar surface forming one leg of the "V" of said recess, said flat planar surface being disposed in use at a first angle with respect to the surface of the associated sheet material and at a second angle with respect to the longitudinal axis of said handle, said blade being movable with respect to said handle for varying said second angle, whereby in use the inclination of said handle with respect to the surface of the associated sheet material may be adjusted without varying said first angle.

2. An adjustable tool for cutting sheet material comprising an elongated handle, a substantially circular blade attached to said handle and extending therefrom, said blade having a recess formed in the perimeter thereof, said blade having two radially outwardly converging surfaces intersecting to form an arcuate cutting edge extending circumferentially thereof between the outer ends of said recess, said arcuate cutting edge extending through an arc of about 270°, said recess including a flat planar surface intersecting said converging surfaces respectively to form two straight cutting edges which intersect at said arcuate cutting edge to form a cutting point, said flat planar surface being disposed in use at a first angle with respect to the surface of the associated sheet material and at a second angle with respect to the longitudinal axis of said handle, said blade being movable with respect to said handle for varying said second angle, whereby in use the inclination of said handle with respect to the surface of the associated sheet material may be adjusted without varying said first angle.

* * * * *